(No Model.)
J. B. ROOT.
ART OF HEATING METAL FOR WELDING.
No. 346,611. Patented Aug. 3, 1886.
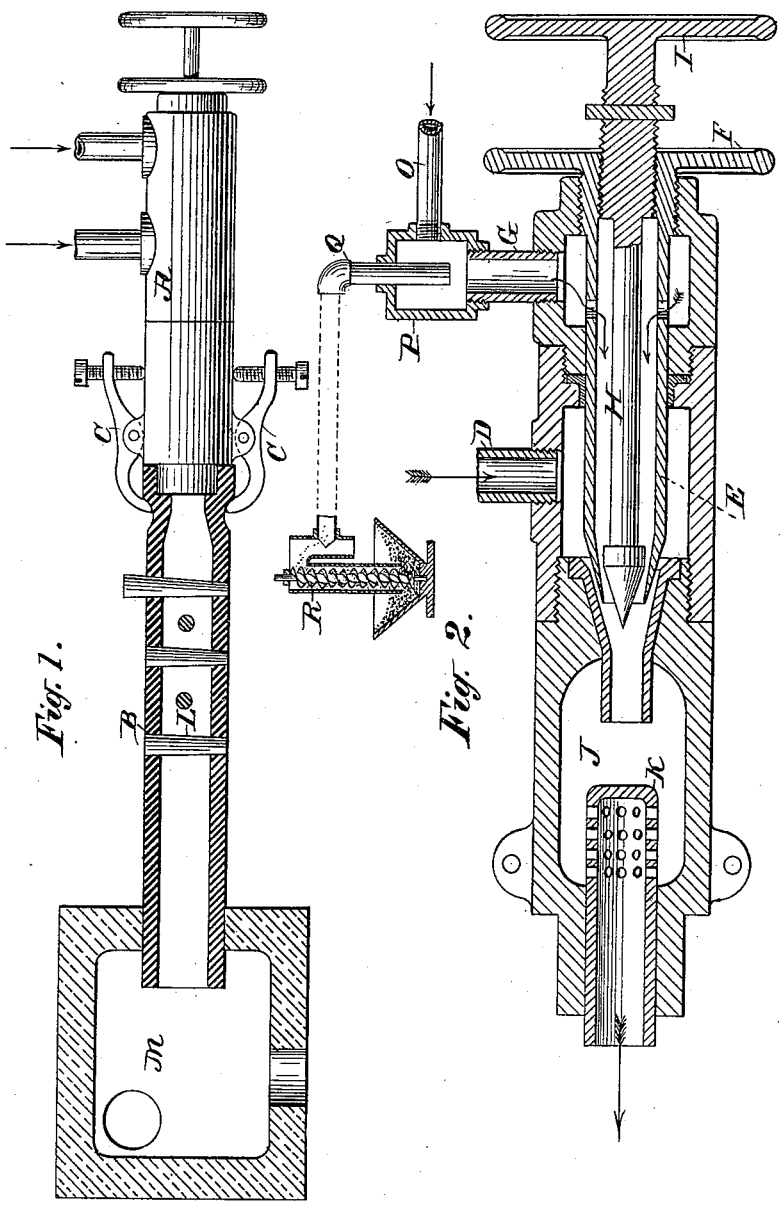
Witnesses:
Robt. F. Gaylord
Robt. H. Duncan
Inventor
John B. Root
by Saml. A. Duncan
Atty

UNITED STATES PATENT OFFICE.

JOHN B. ROOT, OF PORT CHESTER, NEW YORK.

ART OF HEATING METAL FOR WELDING.

SPECIFICATION forming part of Letters Patent No. 346,611, dated August 3, 1886.

Application filed June 11, 1884. Serial No. 134,553. (No model.)

*To all whom it may concern:*

Be it known that I, JOHN B. ROOT, of Port Chester, in the county of Westchester and State of New York, have invented a certain new and useful Method of Welding Metals, of which the following is a full, clear, and exact description, reference being had to the accompanying drawings.

For the manufacture of spirally-formed sheet-metal pipes I have designed and patented, and now have applications pending for patents on, machines for spirally winding the blanks from which such pipes are made and welding the edges of the blanks together. For the purpose of bringing the edges of the blanks to a proper welding condition, a flame or heating-jet is directed upon them. An objection incident to this method of welding is that the oxygen of the heating-flame unites with the heated metal and forms upon its surface oxide of iron and prevents a proper weld being made, this oxide being caused mainly, if not wholly, by the oxygen of the vapor of water which is produced by the combustion of the hydrogen of the gases burned, and in the form of a product of combustion actively attacks the hot iron. I have discovered, however, that if the oxygen of the heating-jet be rendered inactive, as regards the heated blanks, by causing it to unite with an element to form some other compound than vapor of water, the blank is not oxidized or materially affected in any like manner by the flame, and its edges can therefore be properly and securely welded together; and to this end I have discovered that if carbon-dust be introduced into the heating-jet the oxidizing element will be neutralized, so that the jet will have no undesirable effect upon the heated surfaces.
The invention consists, therefore, in applying to the surface of the parts to be welded together a non-oxidizing flame or heating-jet, produced by the combustion of a fuel-gas in the presence of carbon-dust.
Referring to the drawings, Figure 1 is a side view of a blow-pipe adapted to carrying out the invention, with its nozzle in central longitudinal section; and Fig. 2 is a longitudinal section, on an enlarged scale, of the induction-jet of the blow-pipe.

In these views, A represents the induction-jet, which is made of metal.

B is the nozzle or combustion-chamber, which is made of plumbago or some refractory material, and is secured to the jet A by clamps C.

D is the air-inlet, the flow of the air being governed by the tubular valve E, which screws into the shell of the jet at its rear end, and is provided with a hand-wheel, F, for moving it in and out.

G is the gas-inlet, the flow of the gas being regulated by a plunger-valve, H, which acts to close or open the inner end of the tubular valve E, through which the gas is drawn, and is provided with a hand-wheel, I, by which it is operated.

J is the mixing-chamber, in which the gas and air are mingled, the air being forced in under pressure and drawing in the gas.

K is a pipe leading from the mixing-chamber to the nozzle. Its end projects into the mixing-chamber and is provided with perforations, as shown, which help to further mix the air and gas. As the current of air and gas is forced from the mixing-chamber it is still further broken up by cross-bars L set at various angles in the nozzle. After the blow-pipe has been in use a short time this nozzle becomes heated so that its walls and these cross-bars act also to heat the air and gas and bring them to a highly flammable condition. From the combustion-chamber the heated products of combustion are directed upon the metal to be heated, which preferably is passed into and through the chamber M, which confines the heating-flame to the parts to be heated. One of the cross-bars N of the combustion-chamber projects beyond the walls of the chamber, and is loose therein, for the purpose of being removed to ignite the gases.

O represents the pipe leading from the gas-receiver to the inlet G. It enters the chamber P back of the pipe Q, which conducts finely-pulverized carbon and air to this chamber.

R is a screw arranged to elevate the carbon-dust and drop it in front of the opening of the pipe Q. By this or other similar means only as much carbon-dust is taken into the pipe Q as can be carried by the air, and clogging is thus prevented. The carbon-dust is carried on and mingles with the air and gas, and in the combustion-chamber combines with the oxidizing products of combustion and renders them inactive as to the hot iron in substantially this manner: The fuel-gas supplies the hydrogen and the air the oxygen that unite and produce a most intense heat; and this first step of the burning process takes place independently of the powdered carbon, because the hydrogen has a greater affinity for the oxygen than has the carbon in such solid form, the physical relation of the hydrogen and oxygen being atomic, while the carbon is in masses compared with the atoms of oxygen. This preliminary combustion produces vapor of water, and at the same time raises the particles of carbon to incandescence, which establishes a powerful affinity between the carbon and the oxygen of the vapor of water, so that immediately upon the burning of the hydrogen of the fuel-gas a second combustion takes place, that is caused by the union of the oxygen of the vapor of water with the incandescent carbon, thus intensifying the heat of the jet and neutralizing the active power of the oxygen by causing it to form carbonic-acid gas, which, as the final products of combustion, has no undesired action upon the heated iron.

It is essential that the carbon be in the form of dust or powder, or in such form that it will not constitute an element of the first step of combustion, (or that step consisting of the uniting of the hydrogen and oxygen,) but will only be heated by such preliminary combustion; hence carbon in the atomic form will not serve the purpose here described. I also use a flux material to assist in the welding, and this material in a powdered form is preferably carried in with the carbon-dust.

What is claimed as new is—

The hereinbefore-described improvemen's in the art of heating metals for welding, the same consisting in applying to the metal surfaces to be welded a non-oxidizing flame produced by uniting a jet of air and a jet of fuel-gas with carbon-dust, whereby the oxygen of the products of combustion will be prevented from attacking the heated metals, substantially as and for the purpose set forth.

JOHN B. ROOT.

Witnesses:
R. F. GAYLORD,
ROBT. A. DUNCAN.